United States Patent [19]

Brown et al.

[11] Patent Number: 4,529,640

[45] Date of Patent: Jul. 16, 1985

[54] SPACED ARMOR

[75] Inventors: Robert M. Brown, Litchfield Park; Patrick E. Turner, Glendale, both of Ariz.

[73] Assignee: Goodyear Aerospace Corporation, Akron, Ohio

[21] Appl. No.: 483,312

[22] Filed: Apr. 8, 1983

[51] Int. Cl.³ .............................................. B32B 3/12
[52] U.S. Cl. .................................. 428/116; 428/911; 89/36.02; 109/82
[58] Field of Search .............. 89/36 A, 36 H; 109/58, 109/78, 80, 82, 84; 428/73, 116, 118, 911

[56] References Cited

U.S. PATENT DOCUMENTS 4,125,053 11/1978 Lasker ................................. 89/36 A
4,198,454 4/1980 Norton ................................ 89/36 A
4,404,889 9/1983 Miguel ................................ 89/36 A

OTHER PUBLICATIONS

British Plastics, "Reinforcements", 'New Nylon Honeycomb', Dec. 1969, p. 11.

Primary Examiner—Stephen C. Bentley
Attorney, Agent, or Firm—P. E. Milliken; L. A. Germain

[57] ABSTRACT

A configuration for a light-weight composite armor comprises an outer layer of high content carbon steel; an inner laminate of multiple plies of ballistic grade fabric; and an intermediate core material interconnecting the outer steel to the fabric laminate in an established spaced relationship to defeat armor piercing projectiles from the outside while providing a reverse offensive threat from the inside.

17 Claims, 1 Drawing Figure

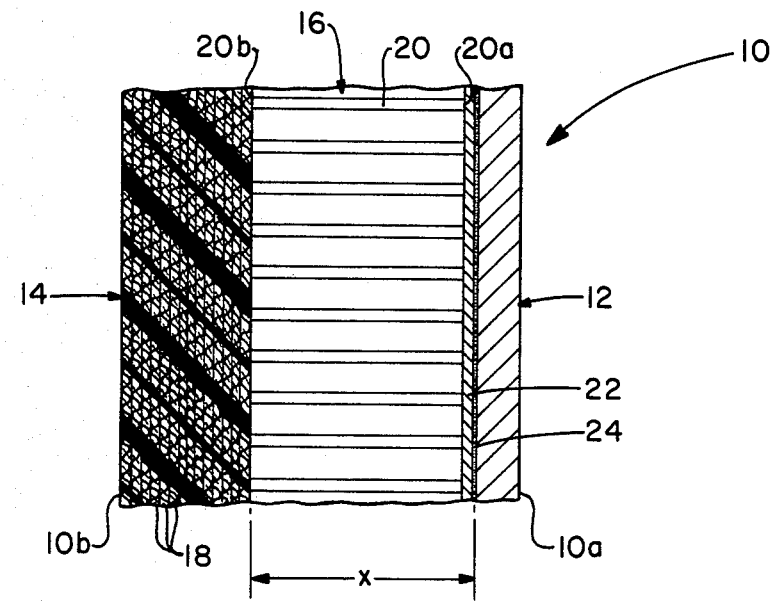

SPACED ARMOR

BACKGROUND OF THE INVENTION

This invention generally relates to protective armor and more particularly to a composite armor configuration that provides an effective defensive barrier against various ballistic threats including armor piercing projectiles.

Recent developments in armor piercing projectiles, such as the metal-jacketed and teflon coated bullet, have made it imperative to develope an armor system that will defeat such a ballistic threat. While many configurations of composite armor have been proposed in the art to defeat various specific armor piercing threats, these suffer in many applications from being too heavy, too costly, and not altogether effective against the newer projectiles.

This invention is a marked improvement in the state of the art by the provision of an armor system configuration that is suitable for panel construction as may be applied to personnel shelters of various types and also for vehicle applications, which armor has proved effective in defeating 30 caliber armor piercing, 30 caliber ball, NATO ball, M-16 and teflon coated projectiles impacting at velocities equal to or less than muzzle velocity. Furthermore, while providing an effective defensive barrier against these type ballistic threats from the outside, it also provides an effective reverse offensive threat to personnel attacking from the outside by reason of effecting a granade or shrapnel barrage to the outside when shot with an armor piercing projectile from the inside.

SUMMARY OF THE INVENTION

Various aspects and objects of the invention are accomplished in a light-weight composite armor comprising an outer layer of high content carbon steel; an inner layer of multiple plies of ballistic grade fabric in a resin matrix laminate; and an intermediate honeycomb core interconnecting the outer steel layer to the fabric laminate in an established spaced relationship to defeat armor piercing projectiles from the outside while providing a reverse offensive threat from the inside.

BRIEF DESCRIPTION OF THE DRAWING

The features and advantages of the invention will be better understood from a consideration of the following description when taken in conjunction with the accompanying drawing wherein the single FIGURE is a cross-sectional view through the composite armor structure, the relative thicknesses of material being for illustrative purposes only and not a limiting factor in the invention.

DETAILED DESCRIPTION OF THE INVENTION

Referring to the drawing, a composite armor is generally indicated by reference numeral 10, the outward facing surface thereof being indicated at 10a and the inside facing surface being indicated at 10b.

Generally, the armor 10 comprises an outer structural element 12, an inner structural element 14, and a core element 16 that effectively positions the outer element 12 in spaced relationship to the inner element 14 by an amount designated "x" in the drawing. The spaced relationship between the outer and inner elements 12, 14 respectively is an important consideration in the development of the armor and this will be elaborated upon hereinafter as the description proceeds.

Now therefore, and more specifically, the composite 10 comprises a lamina, layer, or sheet of hard steel 12 as an outer element. The steel is preferably a high carbon content modified steel known as 4340 Mod Steel and has a carbon content within the range of 0.44–0.49 and a hardness on the Rockwell C hardness scale within the range of 56–59. A minimum thickness of such steel will be about 5.5 mm (0.22 inches) when combined with the other preferred elements to be described.

The material 14 comprises multiple plies of a ballistic grade woven roving fabric 18 impregnated in a resin matrix. A preferred material is a ballistic grade fiberglass woven roving fabric in an epoxy, polyester, or polyvinyl butyl resin matrix, the resin content being from ten to twenty-four percent by weight. For the thickness of steel 12 indicated above, at least fourteen plies of fiberglass fabric are considered adequate to defeat the various ballistic threats hereinbefore mentioned and this will result in a laminate exhibiting a weight of at least twenty-seven ounces per square yard.

The outer steel 12 and inner fabric laminate 14 are tied together into an integral composite structure by a core element 16 that comprises a hexogonal honeycomb 20 having an outside facing surface 20a bonded to an aluminum alloy lamina, layer, or sheet 22. The aluminum alloy sheet 22 is bonded to the outer steel 12 via a polysulfide sealing agent 24 that, while acting as an adhesive which bonds the two elements 22 and 12 together in an inseparable ply, also serves to prevent galvanic action that would normally occur as between steel and aluminum when these are not so protected from each other. The inside facing surface 20b of the honeycomb core 20 is bonded to the fabric laminate 14 to complete the composite structure 10. The honeycomb 20 is preferably a paper honeycomb such as for example, a light-to-medium weight Kraft paper honeycomb, and its purpose is not so much as a protective armor barrier but rather serves primarily to establish the spaced relationship "x" between the steel 12 and ballistic fabric laminate 14.

As hereinbefore mentioned, the spaced relationship between the steel 12 and ballistic fabric 14 is an important consideration in this new armor configuration. In this respect, actual tests conducted on a composite comprised of 5.84 mm of steel 12 directly bonded to fourteen plies of ballistic fiberglass laminate 14, provided no defensive barrier against armor piercing projectiles of the type mentioned when impacted at muzzle velocity. The armor piercing projectiles were able to penetrate through the complete composite structure. However, when the spacing between the steel 12 and fabric laminate 14 was at least 62 mm (2.44 inches) for the same material thicknesses, no penetration of the composite was achieved at impact velocities equal to or less than muzzle velocity.

It will, of course, become apparent to those persons skilled in this art that various alternative materials may be applied to the invention. For example, the fiberglass fabric may be replaced with laminated plies of a ballistic grade aramid fiber fabric such as KEVLAR TM. This will result in a savings in weight by either a reduction in thickness of steel or by the very fact that aramid is inherently lighter in weight than fiberglass. Furthermore fewer plies of aramid fabric may be required to do the same defensive job against the armor piercing projectile. However, this tradeoff is made at a substantial increase in cost inasmuch as equivalent aramid fabrics are at least fifteen times as expensive as a ballistic fiberglass fabric.

Also, it will be recognized, that a paper honeycomb may be replaced with an aramid honeycomb such as NOMEX TM for a savings in weight while also providing flame resistance to the composite. Again, this tradeoff is made at a substantial cost differential which may be meaningful in some applications.

TM DuPont Company, Wilmington, DE.

Apart from its defensive advantages, the armor of this invention also provides a reverse offensive threat to personnel attacking, for example a shelter, from the outside. In this circumstance it has been determined that when the composite is impacted from the inside with an armor piercing projectile such as for example, a teflon coated metal-jacketed armor piercing bullet, such bullet penetrates easily through the laminate 14 and honeycomb 16 and impacts the aluminum-steel outer shell. Such impact effects fragmenting of the steel and these fragments are directed outwardly as shrapnel in the same manner of an exploding granade. The composite armor therefore provides an offensive weapon effective outwardly to a particular range for personnel being protected on the inside of the armor.

While only a single embodiment of the invention has been illustrated and described in detail, it is to be understood that the invention is not limited thereto or thereby, but that various modifications may become apparent to those persons skilled in the art and these are considered to fall within the scope of the appended claims.

We claim:

1. A composite armor to provide a defensive barrier against armor piercing threats from the outside while also providing a reverse offensive shrapnel effect to the outside when impacted from the inside comprising in combination:
   an outer lamina of high carbon steel;
   an aluminum alloy sheet bonded to an inward-facing surface of the steel;
   an inner laminated structure of multiple plies of a ballistic grade fabric in a resin matrix; and
   a honeycomb core positioned intermediate and bonded to the aluminum alloy sheet and to the inner laminated fabric structure to form a composite, said honeycomb core establishing a spaced relationship between the steel and laminated fabric of at least 62 mm (2.4 inches).

2. The composite armor as set forth in claim 1 wherein the inner laminated fabric comprises a ballistic grade fiberglass woven roving fabric in a resin matrix.

3. The composite armor as set forth in claim 1 wherein the laminated fabric comprises a ballistic grade aramid fabric.

4. The composite armor as set forth in claim 1 wherein the honeycomb core comprises a light-to-medium weight paper honeycomb.

5. The composite armor as set forth in claim 1 wherein the honeycomb core comprises an aramid honeycomb.

6. The composite armor as set forth in claim 2 wherein the laminated fabric comprises at least fourteen plies of ballistic grade fiberglass woven roving fabric.

7. The composite armor as set forth in claim 1 where the lamina of steel comprises a modified steel having a carbon content within the range of 0.44 to 0.49.

8. The composite armor as set forth in claim 7 wherein the thickness of steel is within the range of 5.5 mm to 6.5 mm (0.22 inches to 0.26 inches).

9. The composite armor as set forth in claim 1 wherein a polysulfide adhesive bonds the aluminum sheet to the lamina of steel while also providing a galvanic barrier between said aluminum and steel.

10. The composite as set forth in claim 1 wherein the steel has a carbon content within the range 0.44–0.49, the inner laminated structure comprises at least fourteen plies of ballistic fiberglass fabric, and the honeycomb core comprises a paper honeycomb.

11. A composite armor to provide a defensive barrier against armor piercing threats from the outside while also providing a reverse offensive shrapnel effect to the outside when impacted from the inside comprising in combination:
    an outer lamina of steel having a carbon content within the range of 0.44–0.49 and a gauge thickness within the range of 5.5 mm to 6.5 mm;
    an aluminum alloy sheet bonded to an inward-facing surface of the steel;
    an inner laminated structure of multiple plies of a ballistic grade woven roving fabric in a resin matrix; and
    an intermediate honeycomb core structure bonded to the aluminum alloy sheet and laminated fabric to establish a spaced relationship between the steel and laminated fabric of at least 62 mm (2.4 inches).

12. The composite armor as set forth in claim 11 wherein the laminated structure comprises a fiberglass woven roving fabric in a resin matrix.

13. The composite armor as set forth in claim 11 wherein the honeycomb core comprises a paper honeycomb.

14. The composite armor as set forth in claim 11 wherein a polysulfide adhesive bonds the aluminum sheet to the steel and also serves as a barrier to galvanic action as between the aluminum and steel.

15. The composite armor as set forth in claim 11 wherein the inner laminated structure comprises multiple plies of an aramid fabric in a resin matrix.

16. The composite armor as set forth in claim 11 wherein the intermediate honeycomb core structure comprises an aramid honeycomb core.

17. The composite armor as set forth in claim 11 wherein the laminated structure comprises at least fourteen plies of a ballistic grade fiberglass woven roving fabric in a resin matrix and the intermediate honeycomb core structure comprises a paper honeycomb bonded to the aluminum alloy sheet on one of its face surfaces, said aluminum alloy sheet being bonded to the outer lamina of steel via a polysulfide adhesive that prevents galvanic action between the aluminum and steel.

* * * * *